(12) United States Patent
Krüger et al.

(10) Patent No.: US 12,015,325 B2
(45) Date of Patent: Jun. 18, 2024

(54) UNIVERSAL SHAFT WITH A GENERATOR FOR GENERATING ELECTRICITY

(71) Applicant: Off-Highway Powertrain Services Germany GmbH, Lohmar (DE)

(72) Inventors: Max Krüger, Lohmar (DE); Timur Mehmet Kisla, Troisdorf (DE); Mike Mildenberger, Cologne (DE)

(73) Assignee: Off-Highway Powertrain Services Germany GmbH, Lohmar (DE)

( * ) Notice: Subject to any disclaimer, the term of this patent is extended or adjusted under 35 U.S.C. 154(b) by 35 days.

(21) Appl. No.: 17/361,867

(22) Filed: Jun. 29, 2021

(65) Prior Publication Data

US 2021/0408869 A1 Dec. 30, 2021

(30) Foreign Application Priority Data

Jun. 30, 2020 (EP) ..................... 20183141

(51) Int. Cl.
*H02K 7/00* (2006.01)
*H02K 7/18* (2006.01)
*H02K 35/02* (2006.01)

(52) U.S. Cl.
CPC ............. *H02K 7/003* (2013.01); *H02K 7/006* (2013.01); *H02K 7/1892* (2013.01); *H02K 35/02* (2013.01)

(58) Field of Classification Search
CPC .......... G10K 9/122; G10K 9/22; G01F 1/662; G01H 9/008; G01H 11/08; H02K 7/1892
See application file for complete search history.

(56) References Cited

U.S. PATENT DOCUMENTS

| | | | |
|---|---|---|---|
| 4,393,968 A | | 7/1983 | Dee |
| 4,644,246 A | * | 2/1987 | Knapen ................. H02K 37/02 368/64 |
| 10,032,323 B2 | | 7/2018 | Baker |
| 10,288,124 B2 | | 5/2019 | Munk |
| 2014/0188353 A1 | | 7/2014 | Baker |
| 2020/0395814 A1 | | 12/2020 | Kisla et al. |

FOREIGN PATENT DOCUMENTS

| | | | | |
|---|---|---|---|---|
| DE | 102009028566 A1 | | 2/2011 | |
| DE | 102010038654 A1 | | 2/2012 | |
| DE | 102015100656 B3 | | 4/2016 | |
| EP | 2843359 A1 | | 4/2015 | |
| FR | 2815190 A1 | * | 4/2002 | ........... H02K 7/1892 |
| GB | 2550115 A | * | 11/2017 | ............. H02K 11/04 |
| JP | S5697632 A | | 8/1981 | |
| JP | 2006106917 A | | 4/2006 | |
| JP | 2017139840 A | * | 8/2017 | |

OTHER PUBLICATIONS

DE102015100656B3 English translation (Year: 2022).*
FR2815190A1 English translation (Year: 2022).*
DE102010038654A1 English translation (Year: 2022).*
JP2017139840A English translation (Year: 2022).*

* cited by examiner

*Primary Examiner* — Christopher M Koehler
*Assistant Examiner* — Viswanathan Subramanian
(74) *Attorney, Agent, or Firm* — The Webb Law Firm

(57) ABSTRACT

A universal shaft with a generator for generating electricity with the generator being driven by a cardan error occurring with a rotation of the universal shaft.

12 Claims, 2 Drawing Sheets

UNIVERSAL SHAFT WITH A GENERATOR FOR GENERATING ELECTRICITY

CROSS-REFERENCE TO RELATED APPLICATION

This application claims priority to European Patent Application No. 20183141.9 filed Jun. 30, 2020, the disclosure of which is hereby incorporated by reference in its entirety.

BACKGROUND OF THE INVENTION

Field of the Invention

The present invention is in the field of drive technology.

Description of Related Art

Shafts mounted to be rotatable are employed to transmit torque in a drive. Sometimes these shafts are configured as universal shafts and/or are provided with an additional length compensation which is also referred to as a slide. Such universal shafts, which are to be improved with the present invention, are also employed between tractors and agricultural work machines that are pulled, pushed, or carried by the former or in industrial machines. An universal shaft with two universal joints and an intermediate multi-part universal shaft, which realizes a shaft tube as well as segments for length compensation, is typically used between the tractor and the work machine to make the torque transmission independent of which motion the work machine performs relative to the tractor or the towing vehicle.

A universal shaft with a generator for generating electricity is known from US 2014/0188353 A1. The known universal shaft provides room for improvement.

SUMMARY OF THE INVENTION

The present invention relates generally to improving universal shafts, in particular to improving universal shafts of the type described above, preferably in a drive train of a vehicle or a machine and/or between a vehicle and a machine.

It is proposed according to the present invention to provide the universal shaft with a generator for generating electricity. This generator generates electricity, typically for the power supply of the universal shaft itself. Because the latter is often not just an element for transmitting torque; instead, the universal shaft can be provided with at least one sensor that detects the behavior of the universal shaft. This sensor can be a temperature sensor, a strain gauge, a magnetic field sensor, an acceleration or a position sensor that monitors the thermal, dynamic, or mechanical stress on the universal shaft. Such sensors are suitable for early detection of impending wear.

The present invention is based on the object of specifying an improved universal shaft.

To satisfy this object, the present invention specifies a universal shaft that is characterized in that the generator can be driven by a cardan error occurring with a rotation of the universal shaft. According to the present invention, the generator is preferably arranged in a rotationally fixed manner on a shaft body of the universal shaft. A rotationally fixed arrangement is to be understood as an arrangement in which the generator rotates with the shaft body. Correspondingly, a rotationally fixed attachment is to be understood as an attachment in which the component to be attached does not rotate relative to the component to which it is attached. This assembly includes the possibility of arranging the generator on the outer circumference of the shaft body. The generator is preferably arranged within a shaft body of the universal shaft. In this respect, the universal shaft is preferably provided with at least one cavity for receiving the generator. The shaft body that accommodates the generator commonly comprises a piece of pipe or is configured as a pipe. The universal shaft is typically configured as a hollow shaft. The generator according to the present invention is typically such a generator which is functional in and of itself by being arranged on or in the rotating universal shaft. This means that no functional elements of the generator that are not implemented together with the universal shaft are typically provided.

According to a preferred development of the present invention, the generator is configured as an oscillatory system which can be excited by the cardan error in a natural frequency of the oscillatory system. The generator typically comprises a primary part and a secondary part which are arranged to be movable relative to one another for generating electricity by electromagnetic induction.

According to a further development of the present invention, the universal shaft comprises a spring that can be deflected in the circumferential direction of the universal shaft for generating a relative motion between the primary part and the secondary part of the generator. The spring is preferably connected only to the primary part or only to the secondary part. The part not connected to the spring is preferably rigidly connected to the shaft body of the universal shaft and is preferably attached to an inner circumference or an outer circumference of the shaft body. The primary part of the generator is preferably arranged within the secondary part of the generator and is movable along a direction of longitudinal extension of the secondary part. A current is there induced in the generator in a manner known per se by a relative motion between the primary and the secondary part. The direction of longitudinal extension of the secondary part is arranged at a radial distance from a longitudinal axis, typically the central longitudinal axis, of the shaft body. The direction of longitudinal extension of the secondary part generally runs in the direction of rotation, i.e. in the circumferential direction, of the universal shaft. The primary part, which is arranged within the secondary part, is typically configured such that it can be moved relative to the secondary part and along the direction of longitudinal extension of the secondary part due to the radial distance to the central longitudinal axis of the shaft body and the inertia of its mass by a cardan error of the universal shaft.

Due to the integration of the generator within the shaft body of the universal shaft, firstly, increased space requirement can be avoided. Secondly, the universal shaft also provides a protective housing for the generator, and the loads acting during operation (e.g. centrifugal forces and acceleration) are reduced.

The shaft body of the universal shaft can be in particular connected to a universal joint cross. The universal joint cross typically has four journals which are each arranged at right angles to one another, typically in one plane. One shaft body is connected to each opposing journal in a rotationally fixed but universal manner. This makes it possible to transmit torque between the two shaft bodies and at the same time to allow for a certain angular position of the two shaft bodies relative to one another.

According to a development of the present invention, the primary part and the secondary part of the generator in a cross-sectional view of the shaft body in the region of an outer jacket of the shaft body extend in a circumferential direction that is tangential to a radial direction. The direction of longitudinal extension there corresponds to the circumferential direction of the universal shaft. When the universal shaft rotates, the generator experiences a tangential acceleration as a result of this arrangement due to the cardan error, which is used to excite a relative motion between the primary part and the secondary part.

According to a further development of the present invention, the secondary part comprises a curved coil connected in a rotationally fixed manner to the shaft body and the primary part comprises a magnet mounted in a spring-loaded manner deflectable within the coil in the circumferential direction of the shaft body. Further preferably, a winding diameter of the coil windings is smaller than an inner diameter of the shaft body.

The windings of the coil can be attached, for example, to the inner side of the jacket of the universal shaft. The direction of longitudinal extension of the coil is generally defined concentrically to the windings. In particular, it is curved and describes a trajectory—typically along or in a direction opposite to the direction of rotation of the universal shaft—around the central longitudinal axis of the shaft body. This trajectory does not have to be closed. In particular, it can assume the shape of a circular arc around the central longitudinal axis of the shaft body. The shape of the trajectory generally does not restrict the cross-sectional shape of the shaft body, which can be a cross-sectional shape known from prior art, for example, circular, oval, or lemon-shaped, square or star-shaped.

The magnet may be a permanent magnet and can be provided, for example, on a carrier of the primary part which is curved along the trajectory predetermined by the coil and which is surrounded by the windings of the coil. The carrier is typically connected by way of at least one leaf spring extending in the radial direction to a web typically provided at the radial center of the shaft body. This web is connected to the shaft body in a rotationally fixed manner. The web can extend in a plate-shaped manner, starting out from the radial center of the shaft body, and have a width which corresponds to the inner diameter of the shaft body so that the web divides the shaft body into two halves over a certain longitudinal section. The web can also be configured as a rod which is arranged concentrically to the longitudinal axis of the shaft body and which has attachment arms extending radially and possibly offset in the longitudinal direction relative to the generator for the attachment to the inner circumference of the shaft body. In an arrangement of the generator within the shaft body, the leaf springs can be provided on a pot arranged concentrically to the shaft body and connected to a tubular shaft body.

The magnet may be composed of several magnetic segments which are, for example, strung together like a pearl necklace on a curved threaded rod as a carrier, in particular a nylon threaded rod, and are preferably screwed onto the threaded rod. The magnetic segments typically have a magnetic north pole and a magnetic south pole and are strung together having an alternating north-south pole orientation The carrier with two springs provided at its opposite ends preferably defines a sector of a circle with the attachment point on the web at the center of the associated circle.

According to a further development of the present invention, the generator extends in the cross-sectional view of the shaft body substantially over the entire circumference of the shaft body. This means that the primary part, in particular the carrier of the primary part, and/or the secondary part have a substantially closed shape in the circumferential direction, typically the shape of a ring. As a result, the entire circumference of the shaft body can be used to induce a current.

According to a further development of the present invention, several generators are provided in the universal shaft and can be configured as described above. One carrier is generally associated with each generator. The generators can be arranged, for example, offset from one another in the longitudinal direction of the universal shaft. In particular, however, the generators can also be provided at the same longitudinal position in the universal shaft and at different positions in the circumferential direction of the universal shaft. In the cross-sectional view of the shaft body, at least one generator can particularly preferably be provided in each half of the shaft body. In this case, the primary part and the secondary part are arranged along a circular arc, where the length of the circular arc corresponds to a semicircle or less.

Due to the spring-loaded mounting of the primary part and the inertia of its mass, the generator is configured as an oscillatory system that can be excited by a cardan error of the universal shaft. A natural frequency of this oscillatory system is generally dependent on the effective mass of the primary part, the overall stiffness of the springs, and the damping by air friction and the feedback due to the Lorentz force. The natural frequencies of the primary parts of several generators can differ from one another and each be associated with a specific rotational speed of the universal shaft. But they can also be equal. The natural frequencies can be coordinated with the aim of doubling the output of the generator or distributing it over the rotational speed range.

The cardan error is caused by the uneven arrangement of the shaft bodies and leads to an excitation of the primary part with twice the rotational frequency, i.e. the primary part performs two periodic motions for every revolution. Due to the rotational speed and articulation angle-dependent amplitude and the excitation frequency being twice that of the rotational frequency, the use of the cardan error provides a high-performance potential.

According to a further development, the generator is coupled to a logic unit which evaluates the electrical output of the generator to determine an operating parameter of the universal shaft mounted to be rotatable. In this preferred development, the generator also assumes the function of a sensor in addition to the energy-generating function. The logic unit can be integrated into the universal shaft near the generator. For example, it is possible to determine the rotational speed at which the universal shaft is operated by comparing the value of the electrical output and an evaluation table. Regardless of the special characteristics of the generator, the energy generated, in the form of amplitude and frequency, of the generator can be used to analyze the rotational motion of the universal shaft. The operating behavior of the universal shaft can also be analyzed by analyzing the electrical output. A planned operating behavior can be analyzed for determining, for example, the rotational speed or the articulation angle of the universal shaft. Disturbances in the operating behavior can likewise be analyzed, such as misalignment or malfunction of the universal shaft. It is also possible to use the energy generated by the generator to infer the cardan error and to use this to determine the magnitude of the articulation angle of the installation position.

But the logic unit can also be used to evaluate the cardan error of the universal shaft or the angular position between the two shaft bodies of the universal shaft and to determine emerging malfunctions. Further, the electrical energy required to execute the logic unit may be provided by the generator.

The generator may feed power to a transmission which transmits the evaluated data of the logic unit wirelessly to an externally provided receiver which is typically connected to an output device for displaying the data. The data transmitted can be displayed outside the universal shaft, for example, at a control or operating station of a device comprising the universal shaft, for example, an agricultural tractor. This makes it possible to analyze an incorrect setting of the universal shaft and correct it if necessary. Unequal articulation angles at both ends of a universal shaft, which can lead to excessive stress on the universal shaft during operation, can be corrected by adjusting the position of the two drive elements provided at either ends of the universal shaft. For example, an agricultural device driven by way of the universal shaft can be aligned, in a manner that is optimized with regard to the gentle operating behavior of the universal shaft, relative to the agricultural towing vehicle, where the PTO shaft of the latter can be connected to the universal shaft. But other uses are also conceivable. For example, the output device can signal impending wear on the universal shaft and thereby indicate necessary maintenance work.

For reasons of simple assembly, the generator may be provided in a housing which is inserted into a cavity of the universal shaft mounted to be rotatable, preferably pressed or glued thereinto. The housing is typically configured as a sleeve which has a jacket surface that is adapted to the contour of the universal shaft defining the cavity toward the outside. The windings of the coil are typically attached in a rotationally fixed manner to the inner side of this jacket surface. The housing also typically comprises a carrier base, with a web or bridge running along the central longitudinal axis of the universal shaft or the housing, which carrier base is arranged concentrically in the sleeve and is connected to the latter in a rotationally fixed manner. The carrier base can be, for example, dumbbell-shaped, where the bridge connects two ends of the carrier base which are wider than the bridge and which in turn are connected to the sleeve or are manufactured integrally therewith. The sleeve and the carrier base can overall be manufactured integrally. The primary part of the generator is preferably attached to the bridge in the manner described above by way of at least one spring extending in the radial direction. The housing with the generator provided therein in a rotationally fixed manner can by itself be essential to the invention.

The present invention, however, also contains a teaching of a method for operating an universal shaft with a shaft body mounted to be rotatable and a generator provided in a rotationally fixed manner on the shaft body, where a primary part of the generator moves relative to a secondary part of the generator and swings to and fro in a circumferential direction that is tangential to a radial direction of the shaft body when the universal shaft rotates. The primary part and the secondary part can be configured as described above. The primary part is preferably mounted by a respective resiliently flexible component in a vibratory manner in the direction of rotation and in a direction opposite to the direction of rotation of the universal shaft. In contrast, the secondary part is preferably firmly connected to the shaft body. The primary part is therefore excited to oscillate by a rotation or vibration of the universal shaft which, due to the spring-loaded mounting of the primary part, includes a periodic motion in and opposite to the direction of rotation of the universal shaft. A tangential acceleration acting upon the universal shaft due to the cardan error is thus used to excite a relative motion between the primary part and the secondary part, where an electric current is induced even if the rotational speed of the universal shaft remains substantially constant.

The universal shaft may be rotated at a rotational speed which excites the primary part at a natural frequency due to the rotation or due to the cardan error. In this manner, the generator can be excited in a resonant range and therefore with high efficiency. The natural frequency is typically adapted to the rotational speed at which the universal shaft is typically operated during the normal operating process by suitable selection of the parameters that influence it. This rotational speed is typically within a broad rotational speed range. Particularly, several generators with different natural frequencies are provided so that a broad range of rotational speeds from 50 rpm to 6000 rpm, preferably from 500 rpm to 1000 rpm, can be covered.

If a universal shaft is operated at a fixed rotational speed, then the present invention proposes the integration of a circumferentially closed generator, the natural frequency of which is matched to the fixed rotational speed or the associated cardan error, respectively, in order to maximize performance.

The generator may be coupled to a logic unit which evaluates the electrical output of the generator to determine an operating parameter of the universal shaft mounted to be rotatable. Further preferably, the logic unit is in communication with a control device which is coupled for control purposes to a sensor provided on or in the universal shaft and energized by the generator. Preferably, the control device is configured to be adapted such that the logic unit is switched on and/or off in dependence of at least one operating parameter. This allows a measurement by the sensor to be restricted to relevant operating conditions and to possibly save electrical energy.

In an independent aspect, the present invention specifies a drive train of a vehicle or a machine with a universal shaft according to the invention. The universal shaft may be configured according to at least one of the developments discussed above.

BRIEF DESCRIPTION OF THE DRAWINGS

Further details and advantages of the present invention arise from the following description of embodiments in conjunction with the drawing, in which.

DESCRIPTION OF THE INVENTION

Figure 1:
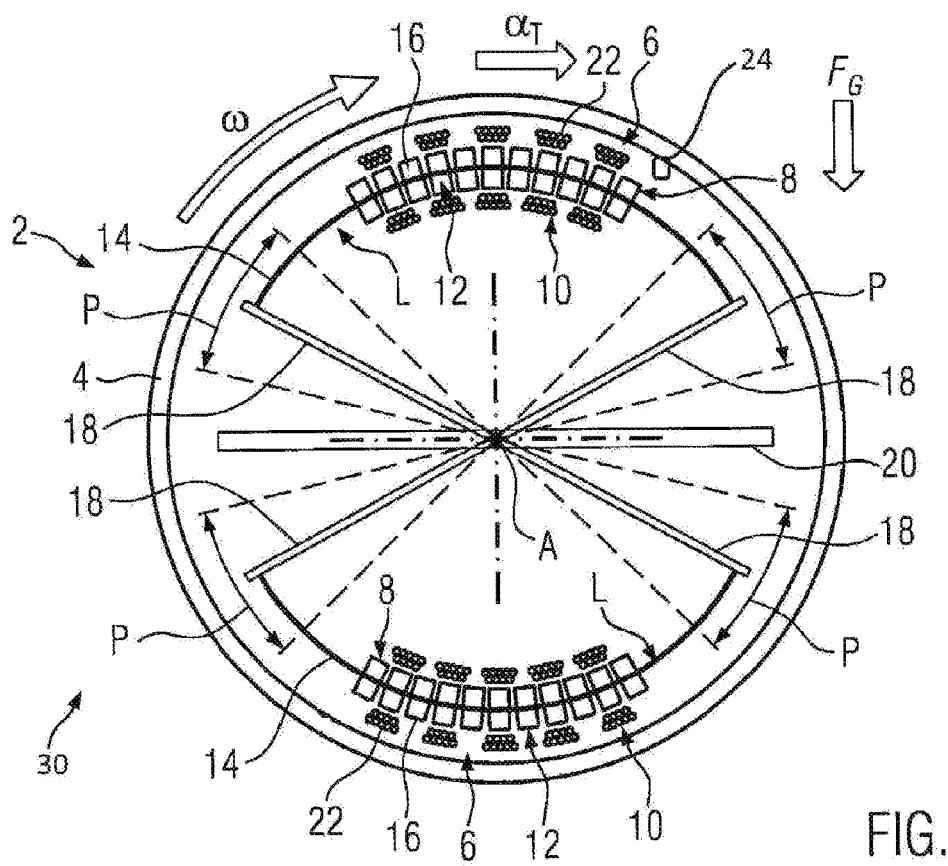
FIG. 1 shows a schematic representation of a cross-sectional view of an universal shaft mounted to be rotatable of a first embodiment, taken along lines 1-1 of FIG. 3.
Figure 2:
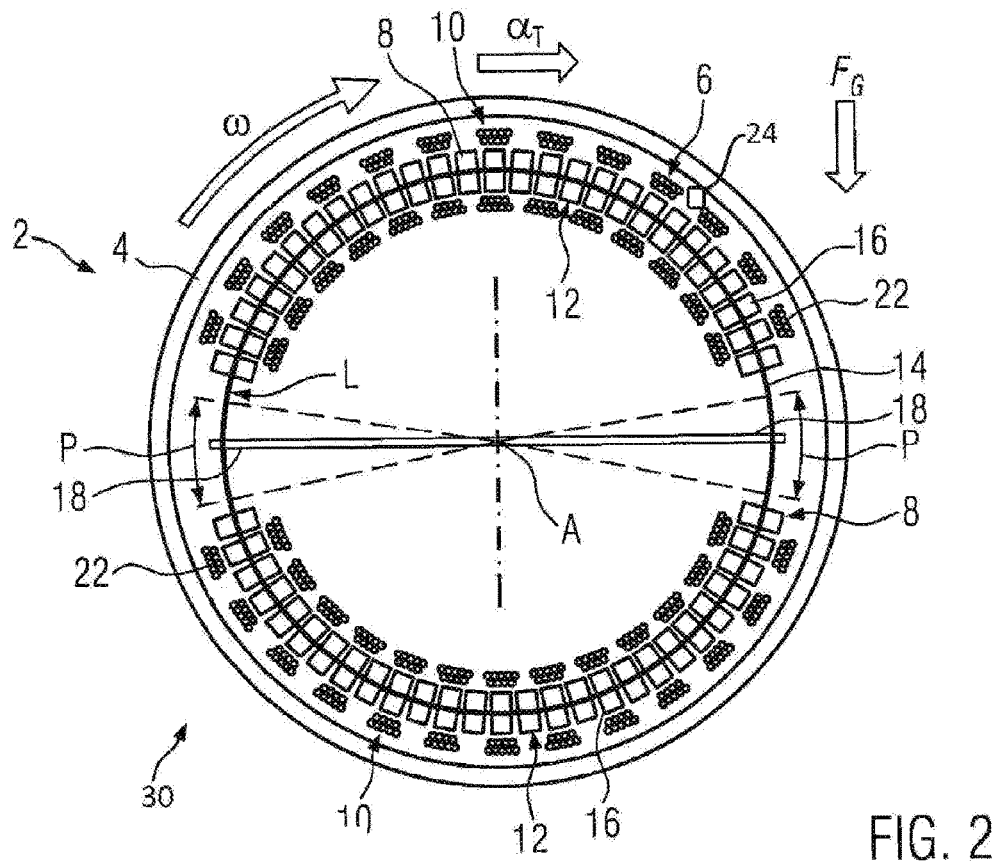
FIG. 2 shows a schematic representation of a cross-sectional view of an universal shaft mounted to be rotatable of a second embodiment.
Figure 3:
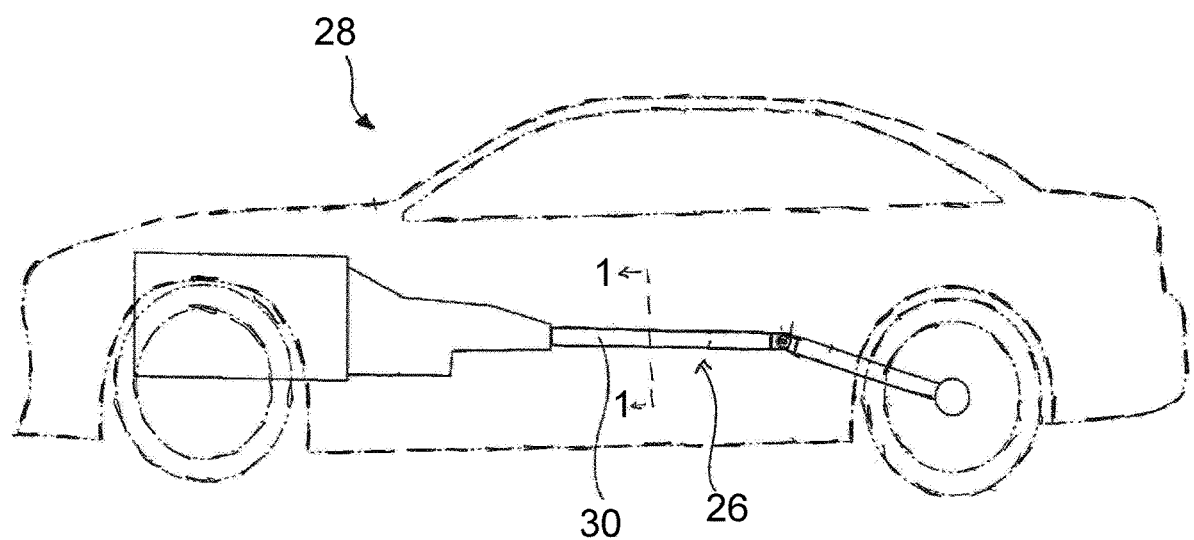
FIG. 3 shows an exemplary embodiment of a drive train of a vehicle.

FIGS. 1 and 2 show embodiments schematically and in a cross-sectional view. The present invention specifies a drive train 26 of a vehicle 28 or a machine with a universal shaft 30 according to the invention as shown in FIG. 3. The universal shaft 30 mounted to be rotatable in these embodiments is configured as a hollow shaft with a shaft body 2 which has a cylindrical jacket 4. It is provided in a horizontal position; i.e. the universal shaft 30 extends axially horizontally. Correspondingly, the weight force F G is shown with an arrow pointing downwardly. Shaft body 2 is rotatable about its central longitudinal axis A. It is referred to hereafter as axis of rotation A. When the universal shaft 30 rotates about the axis of rotation A at an angular velocity ω which points in the circumferential direction of the shaft body 2, a point of mass on the jacket 4 experiences a tangential acceleration $α_T$ which in its magnitude is the product of the distance between the point of mass from the axis of rotation A and the time derivative of the angular velocity ω. The tangential acceleration $α_T$ is perpendicular to the radial direction which points from the jacket surface of the jacket 4 in the direction of the axis of rotation A.

Two generators 6 are provided in the embodiment illustrated in FIG. 1, where one of the generators 6 is provided in the upper half of the shaft body 2 and the other generator 6 is provided in the lower half of the shaft body 2. The generator 6 has a primary part 8 and a secondary part 10, where the primary part 8 comprises a permanent magnet 12 which is attached to a curved nylon rod as a carrier 14. The carrier 14 extends along the direction of longitudinal extension L of the secondary part 10.

The generator 6 may be coupled to logic unit 24 which evaluates the electrical output of the generator 6 to determine an operating parameter of the universal shaft 30 mounted to be rotatable. Further preferably, the logic unit 24 is in communication with a control device which is coupled for control purposes to a sensor provided on or in the universal shaft 30 and energized by the generator 6.

The permanent magnet 12 is composed of individual ring-shaped magnetic segments 16 which are shown only schematically in the figure by rectangles and are alternately strung together having different north pole-south pole orientations on the nylon rod. The carrier 14 is coupled at each of its ends to a leaf spring 18 which extends in the radial direction and is connected at the axis of rotation A to a web or bridge 20 of a carrier base. The carrier base is connected to the jacket 4 of the shaft body 2 in a rotationally fixed manner. The carrier base and/or the carrier 14 should be formed from the same material, in particular steel. Non-magnetic steel, for example austenitic steel or aluminum, are to be preferred in order to prevent magnetic interaction with the primary or the secondary part 10, 12.

Due to the resiliently flexibility of the leaf springs 18 and the inertia of its mass, the primary part 8 is an oscillatory system that can be excited by a rotation of the universal shaft 30 and, in particular, a cardan error of the universal shaft 30. This means that the primary part 8 can be made to perform an oscillating motion which is composed of a motion in the direction of the direction of rotation of the universal shaft 30 and a motion in a direction opposite to the direction of rotation of the universal shaft 30. This creates a relative motion between the primary part 8 and the secondary part 10 which comprises a coil 22 firmly connected to the jacket 4 of the shaft body 2. The coil 22 is wound concentrically around the carrier 14. The windings of coil 22 in the circumferential direction being the outer ones are attached to the jacket 4.

The deflection amplitude of the primary part 8 in the circumferential direction presently corresponds to half of the dual arrow P. The natural frequencies of the primary parts 8 of the generators 6 preferably differ.

The second embodiment shown in FIG. 2 differs from the first embodiment in that only one generator 6 or only one nylon rod is provided as the carrier 14 and which is bent to form a substantially circumferentially closed ring, and that the permanent magnet 12 and the coil 22 extend substantially over the entire circumferential direction of the jacket 4. Nylon is just one exemplary material for the production of the carrier. This carrier should be made of non-magnetic and flexible material. The configuration of the carrier 15 as a threaded rod is used to axially fix and preload the individual ring-shaped segments 16 on the carrier 14. The leaf springs 18 are arranged opposite one another and along a line which divides the shaft body 2 into an upper and a lower half. Alternatively, more than two leaf springs, for example, three to five leaf springs, can be arranged in a star shape to increase the transverse rigidity of the primary part. A circumferential gap in the coil 22 is selected precisely such that the leaf springs 18 do not touch the coils 22 when the primary part 8 deflects.

LIST OF REFERENCE CHARACTERS 2 shaft body
4 jacket
6 generator
8 primary part
10 secondary part
12 permanent magnet
14 carrier
16 ring-shaped segment
18 leaf spring
20 web or bridge of the carrier base
22 coil
24 logic unit
26 drive train
28 vehicle
30 universal shaft
A axis of rotation of the universal shaft
L direction of longitudinal extension of the secondary part
P twice the deflection amplitude
$F_G$ weight force
ω angular velocity
$α_T$ tangential acceleration

The invention claimed is:

1. A shaft with a shaft body and a generator comprising a secondary part and a primary part arranged within said secondary part and movable relative to said secondary part, wherein said generator is provided within said shaft body in a rotationally fixed manner and that said primary part is movable along a direction of longitudinal extension of said secondary part,
wherein said direction of longitudinal extension of said secondary part is at a radial distance to a longitudinal axis of said shaft body,
wherein said secondary part comprises a coil connected in a rotationally fixed manner to said shaft body and said primary part comprises a magnet mounted in a spring-loaded manner deflectable within said coil in the circumferential direction of said shaft body, wherein said magnet is provided on a carrier of said primary part, wherein a first end of said carrier is coupled to a first leaf spring of a plurality of leaf springs and a second end of said carrier is coupled to a second leaf spring of the plurality of leaf springs, and wherein the first leaf spring and the second leaf spring of the plurality of leaf springs extend in a radial direction to a web provided at the radial center of said shaft body.

2. The shaft according to claim 1, wherein said primary and said secondary part in a cross-sectional view of said shaft body in the region of an outer jacket of said shaft body extend in a circumferential direction that is tangential to the radial direction.

3. The shaft according to claim 1, wherein windings of said coil are arranged eccentrically in said shaft body.

4. The shaft according to claim 1, wherein said generator extends substantially over an entire circumference of said shaft body in the cross-sectional view.

5. The shaft according to claim 1, wherein several generators are provided, each generator comprising a respective primary part with a natural frequency.

6. The shaft according to claim 5, wherein, in a cross-sectional view of said shaft body, at least one generator is provided in each half of said shaft body.

7. The shaft according to claim 1, wherein said generator is coupled to a logic unit, wherein said logic unit evaluates an electrical output of said generator for determining an operating parameter of said shaft mounted to be rotatable.

8. The shaft according to claim 1, wherein said generator is provided in a structural unit with a cylindrical jacket introduced into said shaft body.

9. A drive train of a vehicle or a machine, comprising the shaft according to claim 1.

10. A method for operating a shaft with a shaft body and a generator, the method comprising:

moving a primary part of said generator, comprising a magnet and a carrier, relative to a secondary part of said generator, comprising a coil connected in a rotationally fixed manner to said shaft body, said magnet mounted in a spring-loaded manner deflectable within said coil in a circumferential direction of said shaft body, and said magnet provided on said carrier, wherein a first end of said carrier is coupled to a first leaf spring of a plurality of leaf springs and a second end of said carrier is coupled to a second leaf spring of the plurality of leaf springs; and swinging the primary part to and fro in a circumferential direction that is tangential to a radial direction of said shaft body by way of the first leaf spring and the second leaf spring, wherein the first leaf spring and the second leaf spring extend in the radial direction to a web provided at the radial center of said shaft body when said shaft rotates or vibrates, wherein said generator is provided within said shaft body in a rotationally fixed manner.

11. The method according to claim 10, wherein said primary part is excited in its natural frequency by the rotation of said shaft.

12. The method according to claim 10, wherein said shaft is a universal shaft and said primary part is excited in its natural frequency by a cardan error of said universal shaft.

* * * * *